United States Patent
Englin et al.

(10) Patent No.: US 6,928,517 B1
(45) Date of Patent: Aug. 9, 2005

(54) METHOD FOR AVOIDING DELAYS DURING SNOOP REQUESTS

(75) Inventors: Donald C. Englin, Shoreview, MN (US); Donald W. Mackenthun, Fridley, MN (US); Kelvin S. Vartti, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 288 days.

(21) Appl. No.: 09/651,597

(22) Filed: Aug. 30, 2000

(51) Int. Cl.[7] ............................................. G06F 13/00
(52) U.S. Cl. ..................... 711/122; 711/146; 711/151; 710/40
(58) Field of Search ................ 711/122, 141, 146, 711/151, 119, 140; 710/40, 107

(56) References Cited

U.S. PATENT DOCUMENTS

| | | | |
|---|---|---|---|
| 4,349,871 A | 9/1982 | Lary | 364/200 |
| 4,442,487 A | 4/1984 | Fletcher et al. | 364/200 |
| 4,525,777 A | 6/1985 | Webster et al. | 364/200 |
| 4,701,844 A * | 10/1987 | Thompson et al. | 711/119 |
| 4,755,930 A | 7/1988 | Wilson, Jr. et al. | 364/200 |
| 4,794,521 A | 12/1988 | Ziegler et al. | 364/200 |
| 4,807,110 A | 2/1989 | Pomerene et al. | 364/200 |
| 4,843,542 A | 6/1989 | Dashiell et al. | 364/200 |
| 4,860,192 A | 8/1989 | Sachs et al. | 364/200 |
| 5,023,776 A | 6/1991 | Gregor | 364/200 |
| 5,025,365 A | 6/1991 | Mathur et al. | 364/200 |
| 5,025,366 A | 6/1991 | Baror | 364/200 |
| 5,228,135 A * | 7/1993 | Ikumi | 711/131 |
| 5,426,765 A * | 6/1995 | Stevens et al. | 711/131 |
| 5,692,152 A * | 11/1997 | Cohen et al. | 711/140 |
| 5,813,031 A * | 9/1998 | Chou et al. | 711/122 |
| 5,850,534 A * | 12/1998 | Kranich | 711/144 |
| 6,247,094 B1 * | 6/2001 | Kumar et al. | 711/3 |
| 6,253,291 B1 * | 6/2001 | Pong et al. | 711/146 |
| 6,353,877 B1 * | 3/2002 | Duncan et al. | 711/155 |
| 6,457,087 B1 * | 9/2002 | Fu | 710/305 |
| 6,725,344 B2 * | 4/2004 | Pawlowski | 711/146 |

* cited by examiner

*Primary Examiner*—Pierre M. Vital
(74) *Attorney, Agent, or Firm*—Charles A. Johnson; Mark T. Starr; John L. Rooney

(57) ABSTRACT

A method of and apparatus for improving the efficiency of a data processing system employing a multiple level cache memory system. The efficiencies result from enhancing the response to SNOOP requests. To accomplish this, the system memory bus is provided separate and independent paths to the level two cache and tag memories. Therefore, SNOOP requests are permitted to directly access the tag memories without reference to the cache memory. Secondly, the SNOOP requests are given a higher priority than operations associated with local processor data requests. Though this may slow down the local processor, the remote processors have less wait time for SNOOP operations improving overall system performance.

25 Claims, 5 Drawing Sheets

METHOD FOR AVOIDING DELAYS DURING SNOOP REQUESTS

CROSS REFERENCE TO CO-PENDING APPLICATIONS

The present application is related to co-pending U.S. patent application Ser. No. 09/626,030, filed Jul. 27, 2000, entitled Cooperative Hardware and Microcode Control System for Pipelined Instruction Execution; U.S. patent application Ser. No. 08/650,800, filed Aug. 30, 2000, entitled Method for Improved First Level Cache Coherency; U.S. patent application Ser. No. 09/650,730, filed Aug. 30, 2000, entitled Leaky Cache Mechanism; and U.S. patent application Ser. No. 08/235,196, filed Apr. 29, 1994, entitled Data Coherency Protocol for Multi-level Cached High Performance Multiprocessor System, assigned to the assignee of the present invention and incorporated herein by reference.

BACKGROUND OF THE INVENTION

1. Field of the Invention

The present invention relates generally to data processing systems employing multiple instruction processors and more particularly relates to multiprocessor data processing systems employing multiple levels of cache memory.

2. Description of the Prior Art

It is known in the art that the use of multiple instruction processors operating out of common memory can produce problems associated with the processing of obsolete memory data by a first processor after that memory data has been updated by a second processor. The first attempts at solving this problem tended to use logic to lock processors out of memory spaces being updated. Though this is appropriate for rudimentary applications, as systems become more complex, the additional hardware and/or operating time required for the setting and releasing of locks can not be justified, except for security purposes. Furthermore, reliance on such locks directly prohibits certain types of applications such as parallel processing.

The use of hierarchical memory systems tends to further compound the problem of data obsolescence. U.S. Pat. No. 4,056,844 issued to Izumi shows a rather early approach to a solution. The system of Izumi utilizes a buffer memory dedicated to each of the processors in the system. Each processor accesses a buffer address array to determine if a particular data element is present in its buffer memory. An additional bit is added to the buffer address array to indicate invalidity of the corresponding data stored in the buffer memory. A set invalidity bit indicates that the main storage has been altered at that location since loading of the buffer memory. The validity bits are set in accordance with the memory store cycle of each processor.

U.S. Pat. No. 4,349,871 issued to Lary describes a bussed architecture having multiple processing elements, each having a dedicated cache memory. According to the Lary design, each processing unit manages its own cache by monitoring the memory bus. Any invalidation of locally stored data is tagged to prevent use of obsolete data. The overhead associated with this approach is partially mitigated by the use of special purpose hardware and through interleaving the validity determination with memory accesses within the pipeline. Interleaving of invalidity determination is also employed in U.S. Pat. No. 4,525,777 issued to Webster et al.

Similar bussed approaches are shown in U.S. Pat. No. 4,843,542 issued to Dashiell et al, and in U.S. Pat. No. 4,755,930 issued to Wilson, Jr. et al. In employing each of these techniques, the individual processor has primary responsibility for monitoring the memory bus to maintain currency of its own cache data. U.S. Pat. No. 4,860,192 issued to Sachs et al, also employs a bussed architecture but partitions the local cache memory into instruction and operand modules.

U.S. Pat. No. 5,025,365 issued to Mathur et al, provides a much enhanced architecture for the basic bussed approach. In Mathur et al, as with the other bussed systems, each processing element has a dedicated cache resource. Similarly, the cache resource is responsible for monitoring the system bus for any collateral memory accesses which would invalidate local data. Mathur et al, provide a special snooping protocol which improves system throughput by updating local directories at times not necessarily coincident with cache accesses. Coherency is assured by the timing and protocol of the bus in conjunction with timing of the operation of the processing element.

An approach to the design of an integrated cache chip is shown in U.S. Pat. No. 5,025,366 issued to Baror. This device provides the cache memory and the control circuitry in a single package. The technique lends itself primarily to bussed architectures. U.S. Pat. No. 4,794,521 issued to Ziegler et al, shows a similar approach on a larger scale. The Ziegler et al, design permits an individual cache to interleave requests from multiple processors. This design resolves the data obsolescence issue by not dedicating cache memory to individual processors. Unfortunately, this provides a performance penalty in many applications because it tends to produce queuing of requests at a given cache module.

The use of a hierarchical memory system in a multiprocessor environment is also shown in U.S. Pat. No. 4,442,487 issued to Fletcher et al. In this approach, each processor has dedicated and shared caches at both the L1 or level closest to the processor and at the L2 or intermediate level. Memory is managed by permitting more than one processor to operate upon a single data block only when that data block is placed in shared cache. Data blocks in dedicated or private cache are essentially locked out until placed within a shared memory element. System level memory management is accomplished by a storage control element through which all requests to shared main memory (i.e. L3 level) are routed. An apparent improvement to this approach is shown in U.S. Pat. No. 4,807,110 issued to Pomerene et al. This improvement provides prefetching of data through the use of a shadow directory.

A further improvement to Fletcher et al, is seen in U.S. Pat. No. 5,023,776 issued to Gregor. In this system, performance can be enhanced through the use of store around L1 caches used along with special write buffers at the L2 intermediate level. This approach appears to require substantial additional hardware and entails yet more functions for the system storage controller.

The special problem with multiple processor, multiple level, high speed, cached memory systems involving coherency may be resolved through the use of SNOOPing. In this process, the control logic for one cache memory interrogates the tag memory corresponding to other cache memories to determine whether a selected data element has been modified by operation of a different processor. Though this procedure is quite useful, the primary difficulty concerns efficiency.

SUMMARY OF THE INVENTION

The present invention overcomes the problems found in the prior art by providing a method and apparatus for improving the efficiency of maintaining coherency within a system having multiple levels of cache memory. This enhancement to efficiency is accomplished by utilizing improving the efficiency of the SNOOP activity.

The preferred mode of the present invention includes up to four main memory storage units. Each is coupled directly to each of up to four "pod"s. Each pod contains a level three cache memory coupled to each of the main memory storage units. Each pod may also accommodate up to two input/output modules.

Each pod may contain up to two sub-pods, wherein each sub-pod may contain up to two instruction processors. Each instruction processor has two separate level one cache memories (one for instructions and one for operands) coupled through a dedicated system controller, having a second level cache memory, to the level three cache memory of the pod.

Unlike many prior art systems, both level one and level two cache memories are dedicated to an instruction processor within the preferred mode of the present invention. The level one cache memories are of two types. Each instruction processor has an instruction cache memory and an operand cache memory. The instruction cache memory is a read-only cache memory primarily having sequential access. The level one operand cache memory has read/write capability. In the read mode, it functions much as the level one operand cache memory. In the write mode, it is a semi-store-in cache memory, because the level two cache memory is also dedicated to the instruction processor.

In accordance with the preferred mode of the present invention, each dedicated system controller has a level two cache memory, a level two cache tag memory, and two (i.e., one for instruction and one for operand) level one cache duplicate tag memories. Unlike past designs, interfaces to the tag memories are established which are separate and independent of the interface to the level two cache memory. Though, for normal accesses, it is intuitive that the level two cache memory and the tag memories are referenced during the same operation, SNOOP operations access only the tag memories. Thus, the present invention provides the opportunity for regulating memory accesses and SNOOP accesses independently.

The present invention gives the SNOOP accesses priority over other uses of the tag memories. Again, this might seem counterintuitive because it tends to slow access requests from the dedicated processor. However, overall system throughput is increased, because SNOOP requests are honored more quickly permitting the other system processors to operate with less SNOOP request latency.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
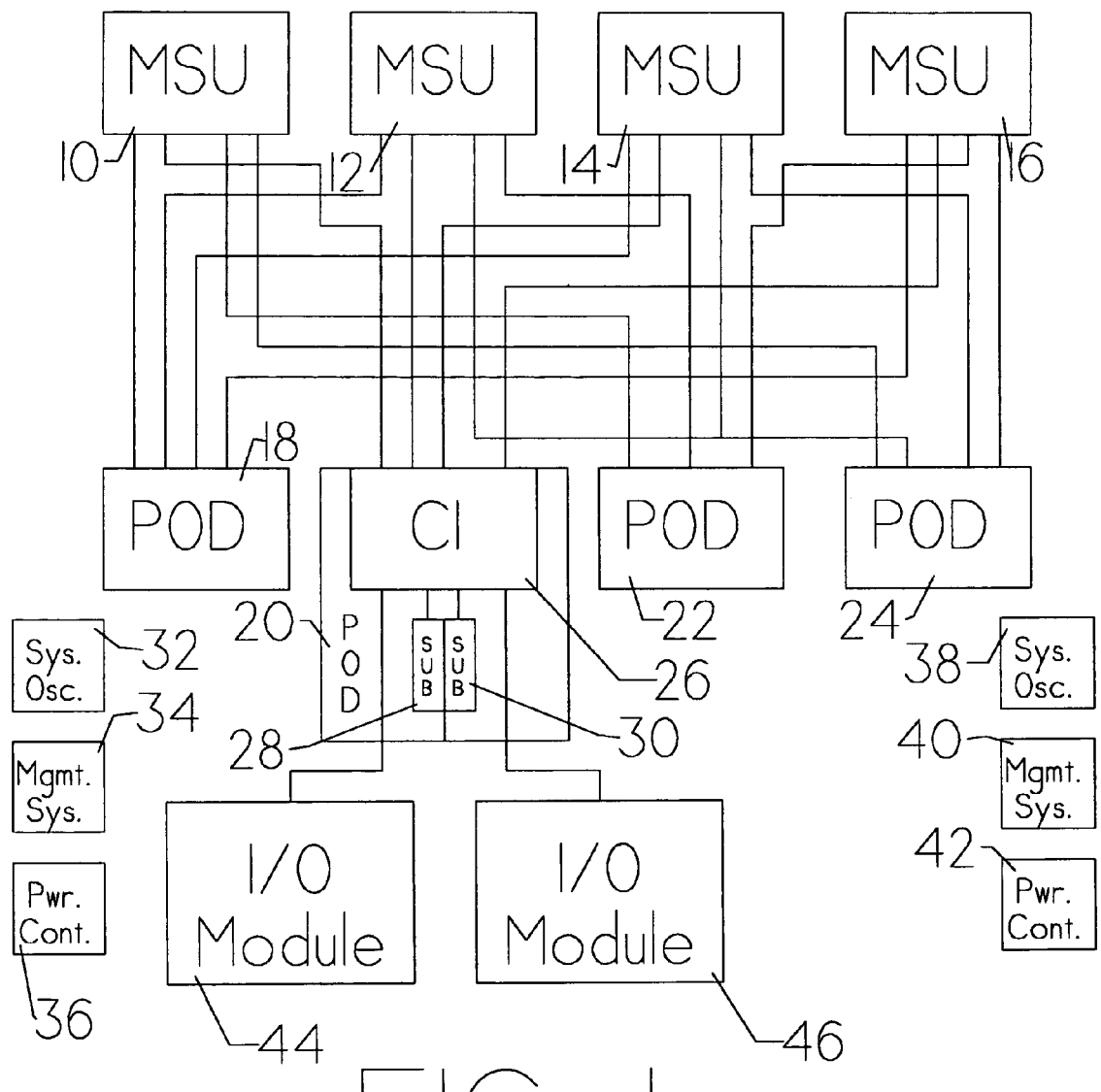
FIG. 1 is an overall block diagram of a fully populated system in accordance with the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
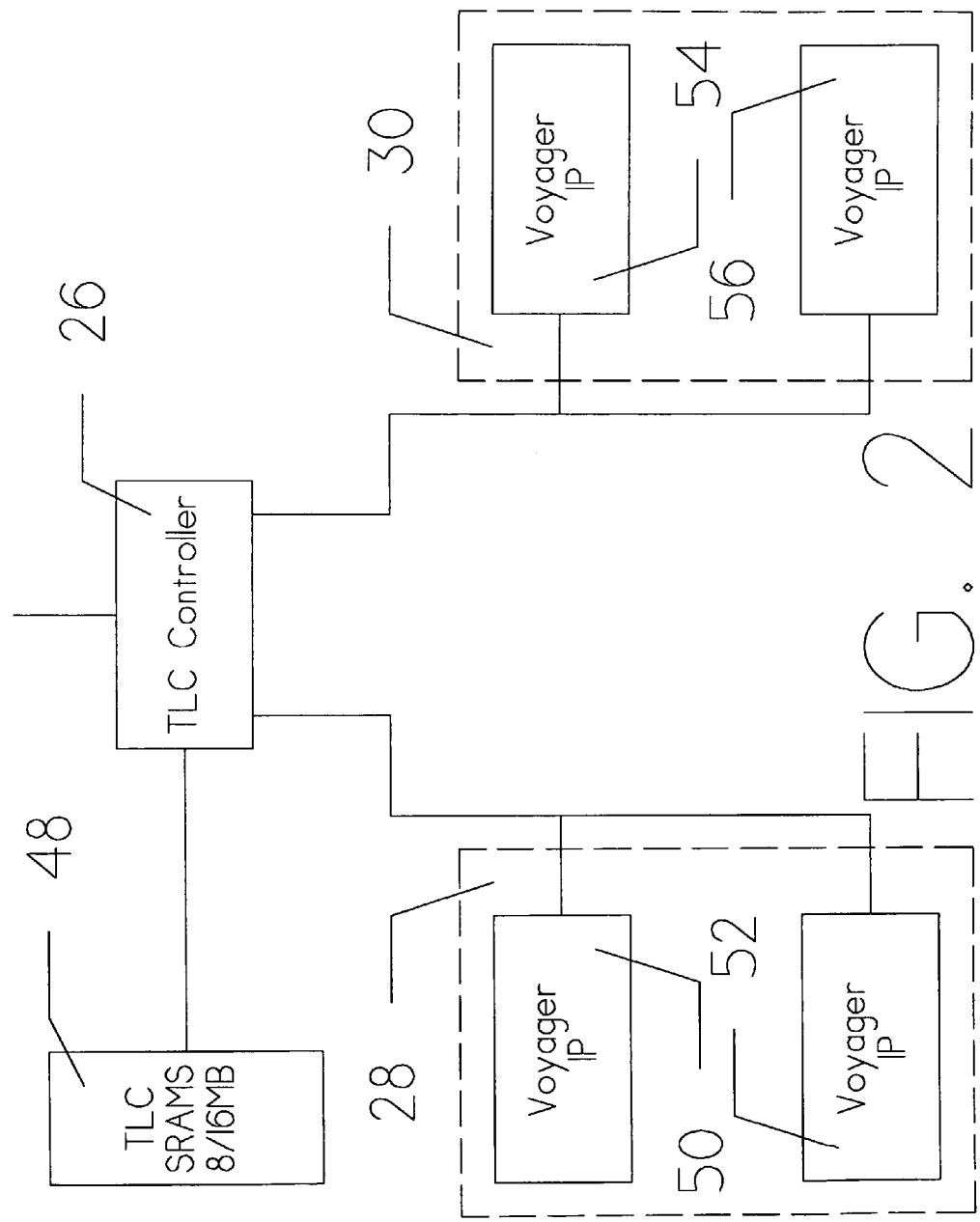
FIG. 2 is a schematic block diagram of one pod.

FIG. 2 is a more detailed block diagram of POD 20. The level three cache memory interfaces directly with the memory storage units via TLC Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
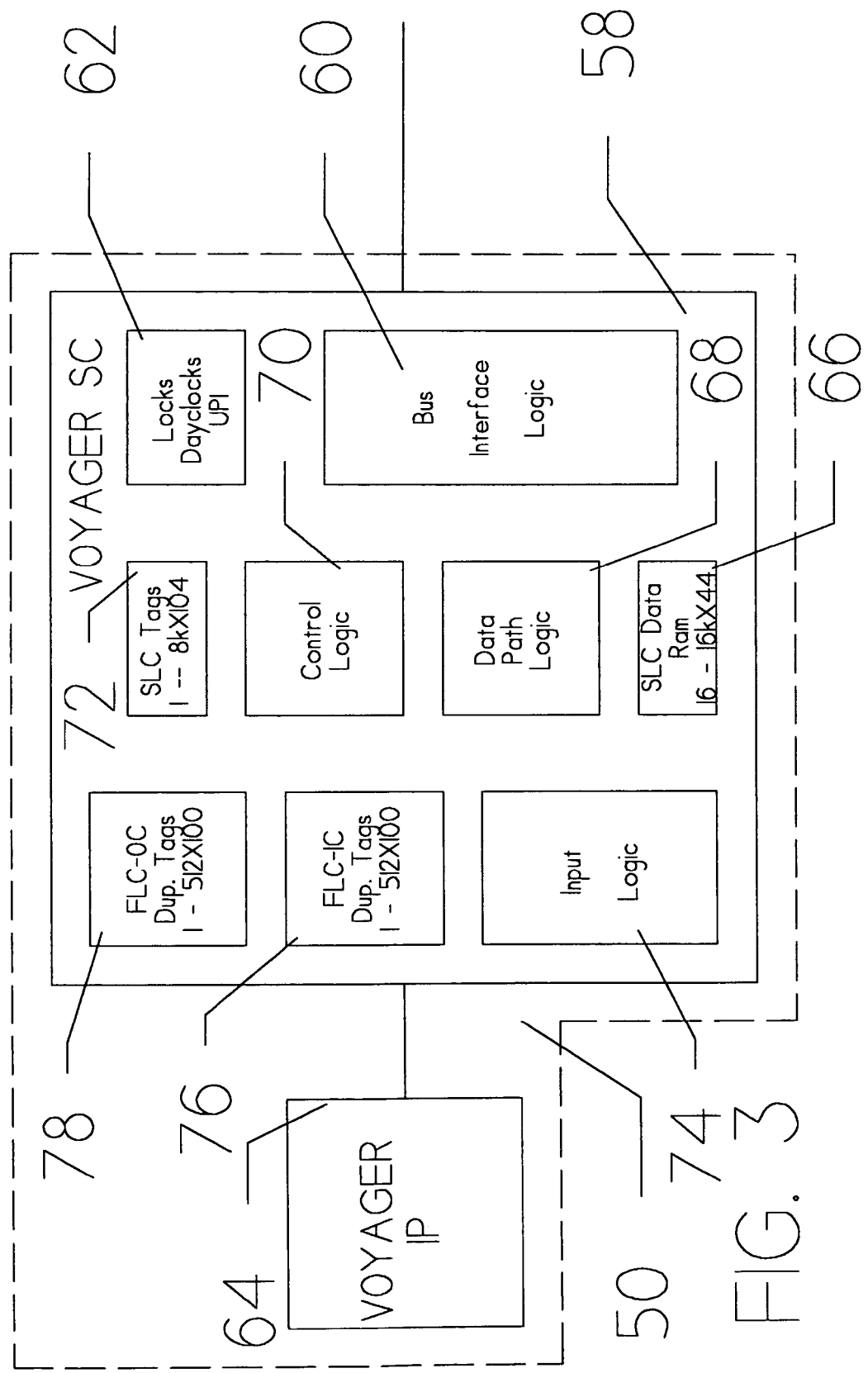
FIG. 3 is a schematic block diagram of one instruction processor along with its dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 68 controls movement of the data through system controller 58. The utilitarian functions are provided by Locks, Dayclocks, and UPI 62.

The remaining elements of system controller 58 provide the level two cache memory functions. SLC data ram 66 is the data actual storage facility. Control logic 70 provides the cache management function. SLC tags 72 are the tags associated with the level two cache memory. FLC-IC Dup. Tags 76 provides the duplicate tags for the level one instruction cache memory of instruction processor 64. Similarly, FLC-OC Dup. Tags 78 provides the duplicate tags for the level one operand cache memory of instruction processor 64. For a more complete discusses of this duplicate tag approach, reference may be made with the above identified co-pending and incorporated U.S. patent applications.

Figure 4:
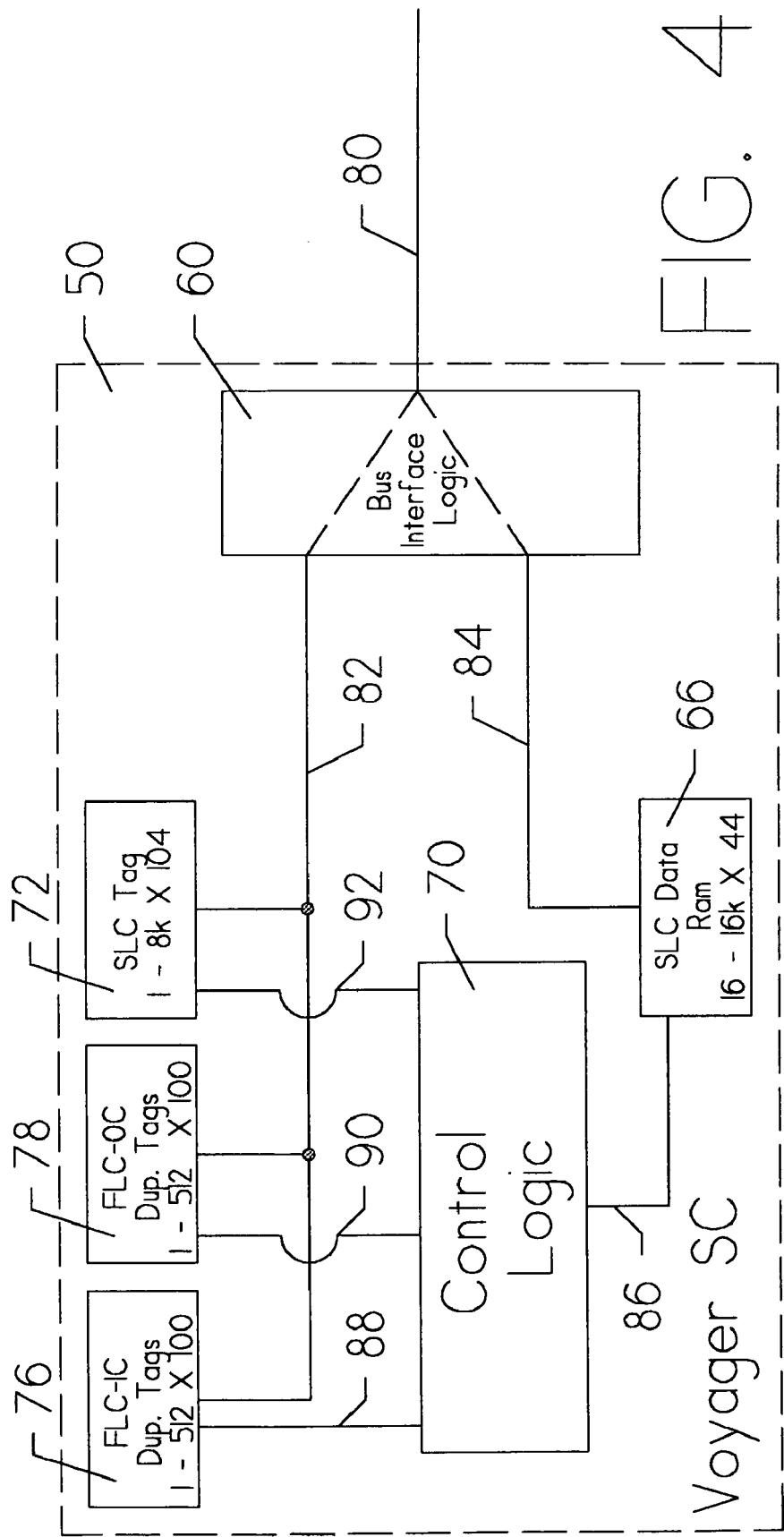
FIG. 4 is a detailed diagram showing data flow of the operation of the present invention.

FIG. 4 is a detailed diagram showing data flow of the operation of the present invention. Shown are the significant components of system controller 50 involved in practicing the present invention.

Bus interface logic 60 couples system controller 50 with third level cache controller 26 and the remaining system controllers of Pod 20 (see also FIGS. 1 and 2) via memory bus 80. Unlike prior art system controller, bus interface logic 60 provides separate and independent paths to level two storage, SLC Data 66, and the three rams storing tag information, FLC-IC 76, FLC-OC 78, and SLC Tags 72. Internal bus 84 couples to the data storage and internal bus 82 couples to the tag memories. In view of these separate and independent paths, the tag memories (i.e., FLC-IC 76, FLC-OC 78, and SLC Tag 72) may be addressed directly from memory bus 80, without access to the cache storage, SLC Data 66.

Given this independent access, control logic 70 has the ability to direct accesses to the tag memories, the cache storage, or both. In accordance with the present invention, control logic 70 always provides higher priority to SNOOP access requests from memory bus 80 to the tag memories than access requests to the cache storage, which also requires access to the tag memories.

Figure 5:
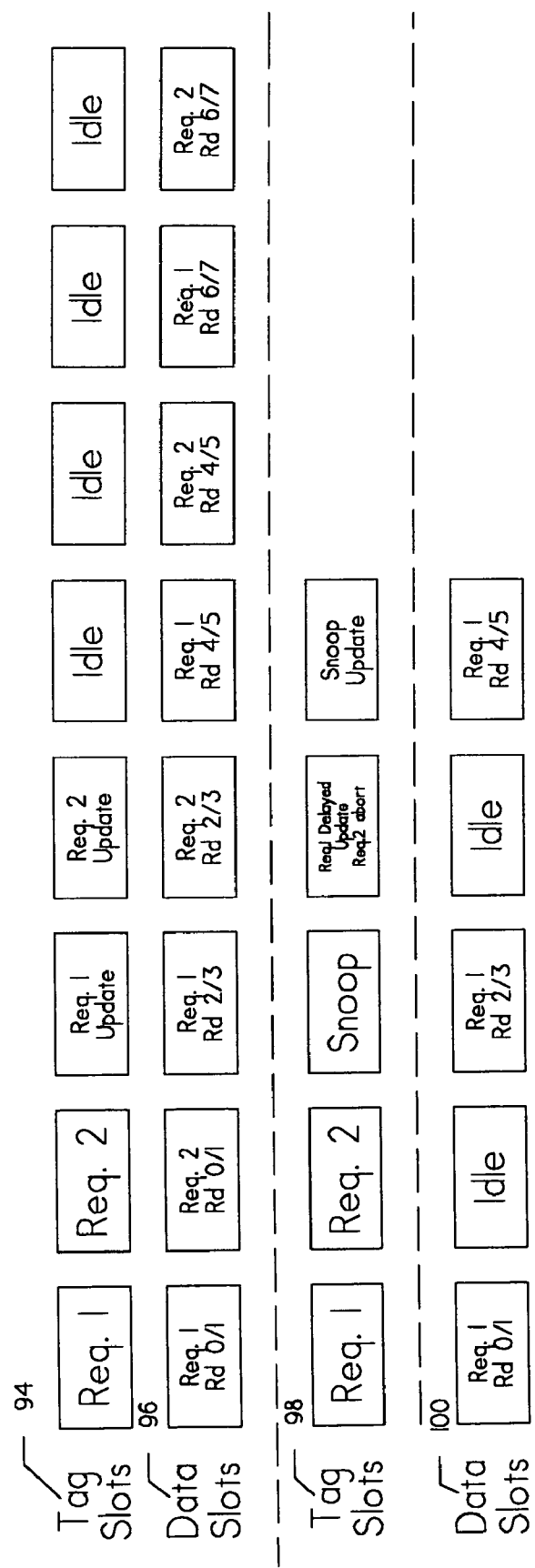
FIG. 5 is a timing diagram of an example in accordance with the present invention.

FIG. 5 is a timing diagram of an example of the operation of the present invention. In the preferred embodiment, the instruction processor timing clock cycles are divided into sub-cycles, called slots. In the present view, time proceeds from left to right in the timing diagram. Each vertical column represents one slot. The two horizontal rows associated with Tag slots 94 and Data slots 96 represent the prior art solution in response to data and SNOOP requests, whereas the two horizontal rows associated with Tag slots 98 and Data slots 100 represent the savings associated with the present invention.

In the prior art solution, a first data request is made (i.e., Req. 1) which occupies both the tag slot and data slot for the first time slot. Similarly, the second request occupies both the tag slot and data slot for the second time slot. The request 1 and request two updates occupy the third and fourth time slots. This happens even though a SNOOP request is present. Thus, the SNOOP request is acted upon only during the ninth tag time slot, because there is no new data request present. This delay of the SNOOP request means that other processors within the system remain idle waiting for the response to the SNOOP request, even though the local processor has all of its requests honored on a high priority basis.

According to the present invention, however, as shown in tag slots 98 and data slots 100, the SNOOP request, is honored upon being presented, because of its high priority. This delays the responses to the data requests of the local processor. However, the remote processor do not need to wait unduly for the honoring of the SNOOP request. Thus, overall system throughput is increased.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. In a data processing system including a plurality of processors each directly coupled via a system memory bus wherein a first processor of said plurality of processors contains a level one cache memory directly coupled to a level two cache memory which is coupled to a level three cache memory via a level three cache controller, said level two cache memory containing cache storage and tag storage and containing a circuit for SNOOPing said system memory bus, the improvement comprising:

A system memory bus interface providing a unit first dedicated interface between said system memory bus and said cache storage and a second dedicated interface between said system memory bus and said tag storage to a separate and dedicated port of said tag storage.

2. A data processing system according to claim 1 further comprising control logic directly coupled to said cache storage and said tag storage which provides the highest priority for said SNOOPing.

3. A data processing system according to claim 2 wherein said level two cache memory further comprises:

A duplicate tag memory.

4. A data processing system according to claim 3 wherein said plurality of processors further comprises A plurality of instruction processors.

5. A data processing system according to claim 4 wherein said level three memory further comprises:

A level three cache memory.

6. A data processing system comprising:

a. A plurality of processors including a first processor containing a level one cache memory;

b. A level two cache memory containing a data memory and a tag memory wherein said tag memory has a first port and a second port directly coupled to said level one cache memory;

c. A system memory bus directly coupled to said plurality of processors and directly coupled to said data memory and directly and independently coupled to said tag memory via a separate and said second port of said tag memory; and d. A SNOOP request placed on said system memory bus and directly coupled to said tag memory.

7. A data processing system according to claim 6 further comprising:

A data request transferred from said level one cache memory to said level two cache memory.

8. A data processing system according to claim 7 further comprising:

Control logic within said level two cache memory which provides priority of said SNOOP request over said data request.

9. A data processing system according to claim 8 further comprising:
   a. A level one tag memory located within said level one cache memory; and
   b. A duplicate tag memory within said level two cache memory which maintains a duplicate of information within said level one tag memory.

10. A data processing system according to claim 9 wherein said SNOOP request is directly coupled to said duplicate tag memory.

11. A method of maintaining validity of data within a level one cache memory of a processor having a level one tag memory directly coupled to a level two cache memory containing a tag memory and a data memory wherein said level two cache memory is directly coupled via a system memory bus interface to a system memory bus to said data memory via a first dedicated path and to said tag memory via a second separate and dedicated path within said system memory bus interface comprising:
   a. Formulating a SNOOP request;
   b. Presenting said SNOOP request on said system memory bus to said level two cache memory;
   c. Routing said SNOOP request directly to said tag memory via said second dedicated path; and
   d. Processing said SNOOP request.

12. A method according to claim 11 further comprising:
   a. Presenting a data request from said level one cache memory to said level two cache memory; and
   b. Granting priority to said SNOOP request over said data request.

13. A method according to claim 12 further comprising:
Maintaining a duplicate copy of said level one tag memory within a duplicate tag memory within said level two cache memory.

14. A method according to claim 13 further comprising:
Routing said SNOOP request to said duplicate tag memory.

15. A method according to claim 14 further comprising:
Processing said SNOOP request regarding said duplicate tag memory.

16. An apparatus comprising:
   a. Executing means for executing program instructions;
   b. Level one caching means directly coupled to said executing means for level one caching data;
   c. Requesting means directly coupled to said executing means and said level one caching means for requesting a data element if said executing means requires requesting of said data element and said level one caching means does not contain said data element;
   d. Level two caching means directly coupled to said requesting means for level two caching;
   e. Storing means located within said level two caching means for storing level two caching data;
   f. Maintaining means located within said level two caching means for maintaining level two tags; and
   g. SNOOPing means directly coupled via a dedicated path separate from said storing means to said maintaining means for directly SNOOPing said level two tags.

17. An apparatus according to claim 16 further comprising:
   a. Granting means directly coupled to said storing means and said maintaining means for granting priority to a SNOOP request over said data element request.

18. An apparatus according to claim 17 further comprising:
   a. Bussing means directly coupled to said level two caching means for bussing system memory data;
   b. First interfacing means directly coupled to said bussing means for interfacing said bussing means directly to said storing means; and
   c. Second interfacing means directly coupled to said bussing means for interfacing said bussing means directly to said maintaining means.

19. An apparatus according to claim 18 further comprising:
   a. Recording means located within said level one caching means for recording level one tags; and
   b. Duplicating means located within said level two caching means and directly coupled to said recording means for duplicating said level one tags.

20. An apparatus according to claim 16 further comprising:
   a. SNOOPing means directly coupled to said bussing means and said duplicating means for SNOOPing said duplicating means.

21. A data processing system having a plurality of processors comprising:
   a. a main memory;
   b. a system bus responsively coupled to said main memory;
   c. a plurality of cache memory units wherein each of said plurality of cache memory units is dedicated to a different one of said plurality of processors;
   d. a plurality of cache data storage units wherein each of said plurality of cache data storage units is located in a different one of said plurality of cache memory units;
   e. a plurality of tag storage units wherein each of said plurality of tag storage units is located in a different one of said plurality of cache memory units and each of said tag storage units has a plurality of ports including one of said plurality of ports dedicated to snooping;
   f. a plurality of first direct paths wherein each of said plurality of first direct paths directly couples a different one of said plurality of cache data storage units to said system bus within a system bus interface; and
   g. a plurality of second direct paths wherein each of said plurality of second direct paths directly couples a different one of said plurality of tag storage units via said one of said plurality of ports dedicated to snooping to said system bus within said system bus interface.

22. A data processing system according to claim 21 wherein at least one of said plurality of processors further comprises an instruction processor.

23. A data processing system according to claim 22 wherein said at least one of said plurality of processors further comprises a dedicated level one cache memory.

24. A data processing system according to claim 23 wherein said dedicated level one cache memory further comprises a read only instruction cache memory.

25. A data processing system according to claim 24 wherein said dedicated level one cache memory further comprises a read/write operand cache memory.

* * * * *